W. J. P. OLSEN
MACHINE FOR CAPPING RECEPTACLES.
APPLICATION FILED JUNE 8, 1911.

1,059,949.

Patented Apr. 22, 1913.
7 SHEETS—SHEET 1.

Fig. 1.

W. J. P. OLSEN.
MACHINE FOR CAPPING RECEPTACLES.
APPLICATION FILED JUNE 8, 1911.

1,059,949.

Patented Apr. 22, 1913.
7 SHEETS—SHEET 7.

Fig. 8.

WITNESSES
Harry S. Gaither
E. H. Lundy

INVENTOR
Waldemar Jens Peter Olsen
by Frank D. Thomason
Atty

UNITED STATES PATENT OFFICE.

WALDEMAR JENS PETER OLSEN, OF BROOKLYN, NEW YORK, ASSIGNOR OF ONE-HALF TO WESTERN STOPPER COMPANY, OF SAN FRANCISCO, CALIFORNIA, A CORPORATION OF CALIFORNIA.

MACHINE FOR CAPPING RECEPTACLES.

1,059,949. Specification of Letters Patent. Patented Apr. 22, 1913.

Application filed June 8, 1911. Serial No. 631,881.

*To all whom it may concern:*

Be it known that I, WALDEMAR JENS PETER OLSEN, a subject of the King of Denmark, having made his first declaration of becoming a citizen of the United States, residing at Brooklyn, in the county of Kings and State of New York, have invented new and useful Improvements in Machines for Capping Receptacles, of which the following is a full, clear, and exact description.

My invention relates to machines for closing the mouths of bottles with metal caps or covers, and more particularly to the mechanism thereof for regulating the pressure of the capping devices.

The principal object of my invention is to provide such a machine with automatic devices, which, when the requisite pressure is exerted upon the cap to seal the bottle, will release the actuating mechanism of the capping plunger and permit the return of the same to its original position.

Another object of my invention is to enable the operator to regulate the sealing pressure at which the release of the actuating mechanism of the capping plunger will take place.

Still another object is to permit of the adjustment of the position of the capping plunger and its actuating mechanism to enable the machine to accommodate and cap bottles of different heights.

These and other objects I accomplish by the means and in the manner hereinafter full set forth, and as more particularly pointed out in the claims.

Referring to the drawings, it will be seen that the machine preferably consists of suitable platform 1 supported on standards 2, 2, which latter extend above said platform and have shelf 3 mounted upon their upper ends. These standards are preferably three in number, two being disposed in front of the machine and one in the rear. A suitable revoluble turntable 4 is mounted near the rear of the machine, adjacent to one side thereof, in a horizontal plane slightly above that of the platform 1, and the lower end of its vertically disposed shaft or spindle 5 is suitably journaled in the framework of the machine and driven by means of a beveled gearing above shelf 3. A similar turntable 6, of less diameter, is located on the opposite side of the rear portion of the machine and mounted on the lower end of the vertically disposed spindle 7.

Turntable 4 and turntable 6 are situated near the rear of the machine, one on each side of the center of width of the same, and the vertical shafts 5 and 7 on which they are mounted are suitably journaled in the framework of the machine, and are driven at the same speed by a transverse horizontal shaft $x$ through the medium of beveled gears on the ends thereof.

A suitable runway 15 for feeding bottles to these turntables is, preferably, arranged with its side walls in parallel planes tangential to shaft 5, and the end portions of its side walls extend over turntable 4 and are flared to give proper direction to the bottles. The edges of these turntables contact, and immediately in front of this contact a vibratory switch-arm 16 is pivoted that extends toward the mouth of runway 15 and vibrates from one side wall thereof to the other, to sweep every alternate bottle off of turntable 4 onto turntable 6, and direct the bottles not so moved onto turntable 6 to, what is known as the turret 8. Turntable 6 also has a turret 8 in front of it, which corresponds to and is in the same transverse plane as the turret in front of 4. These turrets each comprise an intermittently revoluble circular plate, which is provided with a plurality of equidistant spurs 9, between which a series of pockets is formed into which the bottles from the turntables are successively moved. In order, however, to insure their moving into these pockets, the bottles of first one turntable and then the other are engaged by the transverse blade 17, on the lower ends of vertically disposed walking beams 18. These beams, 18, are fulcrumed at their upper ends on a shaft 18$^a$ mounted in the framework of the machine and their upper ends are provided with embossments that engage cams 79 on the main-shaft 34 of the machine. They are kept in contact with said cams through the medium of coil springs 18$^b$, and as said cams 79 are arranged upon said shaft in positions just the opposite of each other, the lower end of one of said beams moves toward the turret in front of it to insure the bottles fitting into the adjacent pockets thereof, while the other moves away from its turret, and vice versa. As the turrets revolve the bottles are kept in said pockets for one-half a revolution by segmental guards 11, and until the forward edges of said bottles come in contact with the transverse walls of gages 14, which latter are adjustable longitudinally, toward and from the turret by means of set screws passed through slots in the extensions of the same into table 13 in front of the machine,—in front of which latter the operator stands to remove the bottles as they are capped. This table has a central rearward extension which has its upper surface in the same plane as said table. Midway between the front portions of the turrets this extension is provided with guide-wall 12, the center of the transverse length of which is formed into a forwardly projecting point from which it curves backward and transversely toward the turrets.

Just below their upper bearings the turret shafts 10 are provided with circular disks 19, and these disks have a series of equidistant studs 20 projecting from their upper surfaces. I prefer to have but four of these studs 20 so that when engaged they will move the disks and turret-shafts one-quarter of a revolution and bring two of the pockets of the turret (with the bottles therein) to the front immediately back of the gages 14 in position to be simultaneously capped or closed, by the mechanism hereinafter to be fully described. These disks are actuated by pawls 27, the engaging ends of which are formed to correspond somewhat to the shape of the thumb and index finger of the human hand. The portion corresponding to the finger curves toward the rear, and the part corresponding to the thumb is engaged by the studs 20. The pawls 27 extend toward the central portion of the machine and are pivoted to the underside of a transversely reciprocal bar 22, which latter has bearings in the framework of the machine that guide its movements.

These pawls have lugs 25 extending rearwardly from the bosses of their pivoted ends, and a coil spring 26 is interposed between these ends, the function of which is to keep said pawls constantly in engagement with the studs 20 of disks 19.

The bar 22 is reciprocated by a horizontal vibratory arm 24 the forward end of which is suitably pivoted to the underside of the same between the pivots of pawls 27. Arm 24 is disposed in a horizontal direction and its rear end is rigidly secured to the lower end of a shaft 28. Shaft 28 extends up through a hollow standard 30 and its upper end has the boss of a transversely extending, comparatively long arm 29 suitably secured thereto. The movable end of this arm terminates at a point slightly beyond the plane of the side of the machine and has a ball-joint connection with the rear end of a link 31, the forward end of which latter is pivotally connected to a head journaled on a projecting crank-pin 32 of a wheel 33 on the adjacent end of the main-shaft 34.

The cap-blanks are preferably stored in a magazine 35 mounted in a suitable bracket projecting forward from the upper portion of the framework consisting of sleeves, 58$^a$, adjustably mounted on the upper ends of the front standards 2, 2, and connected by cross-bars, 58, as will be hereinafter more fully described. From this magazine cap-blanks gravitate into a substantially funnel-shaped hopper 36, and this hopper has a chute 37 removably secured to the walls of the discharge opening in the lowermost portion of the same, which is so constructed and arranged that the blanks are fed from the lower rearwardly curved discharge mouth 38 in substantially a horizontal plane to their proper position in the lower end or head 39 of a capping-plunger 40 ready to be clamped down upon the mouth of the bottle.

In the machine here illustrated I have shown two pairs of these capping plungers, but I desire to state that any number may be employed according to the necessities of the machine. They are all identical in construction and are operated each in the same manner, the operative parts being merely duplicates. Therefore for the purposes of convenience the construction and operation of but one plunger will be described herein, with the understanding said description will apply to all.

The plunger 40 comprises a vertically reciprocal bar, substantially rectangular in cross-section, the upper end of which is slidably mounted in a bearing 41 in a rearwardly projecting member of the cross-bars connecting the bosses of the U-shaped bracket 58$^a$, which latter are suitably secured to the upper ends of the front standards 2, 2. This bar is bored out its entire length to form a hollow chamber 44, and its lower portion is screw-threaded and partially closed by a bushing 45 threaded therein. The head 39 is securely clamped to this lower end of the plunger and is provided with a central opening 46 of approximately the same diameter as the outside dimension of the cap of the bottle after it is clamped on the bottle. A transverse (horizontal) slot 47 is cut in this head which registers with the mouth 38 of the feed-chute 37 hereinbefore mentioned, below which the opening 46 is widened to form a flaring sleeve 48 that guides and centers the head of the bottle to make it register with said cap.

Figure 1:
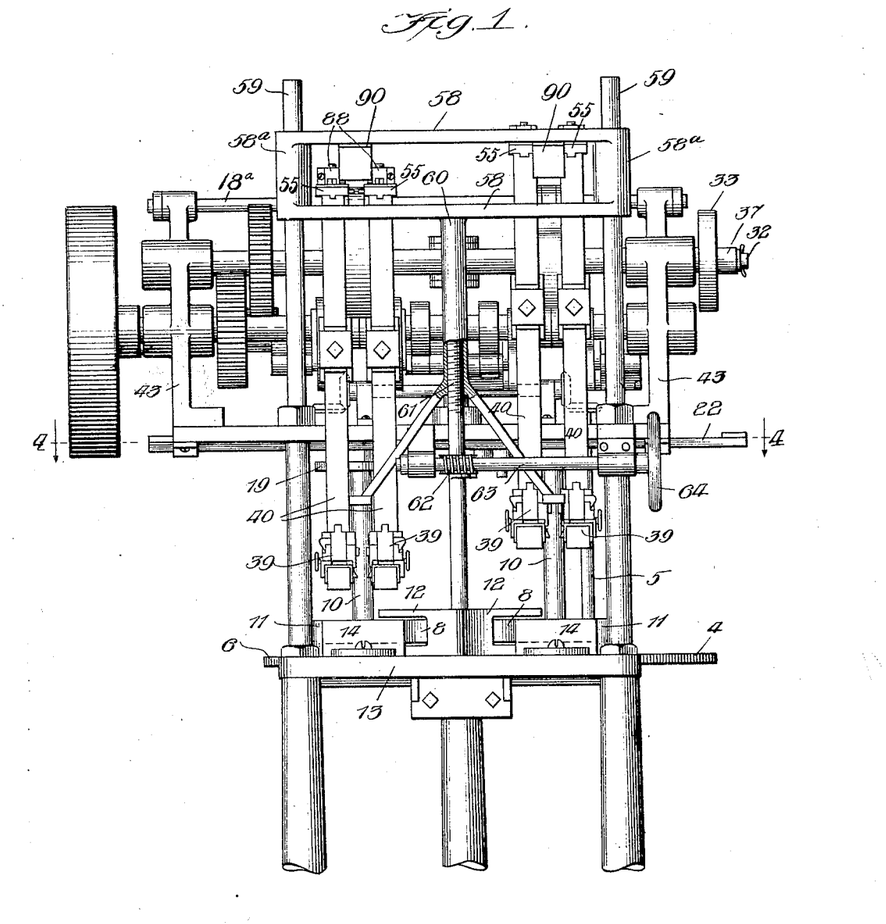
Figure 1 is a vertical front elevation of my improved capping machine, having the cap-magazine and hopper removed for clearness.
Figure 2:
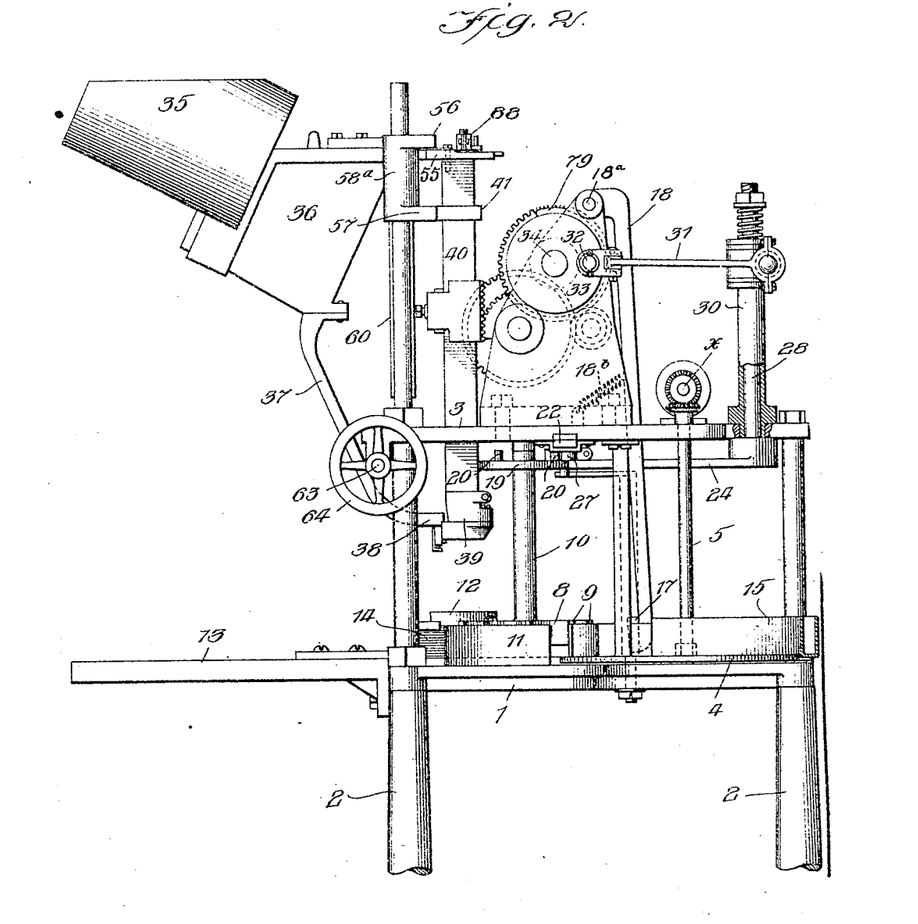
Fig. 2 is a vertical side elevation of the same, showing the magazine and hopper in position.
Figure 3:
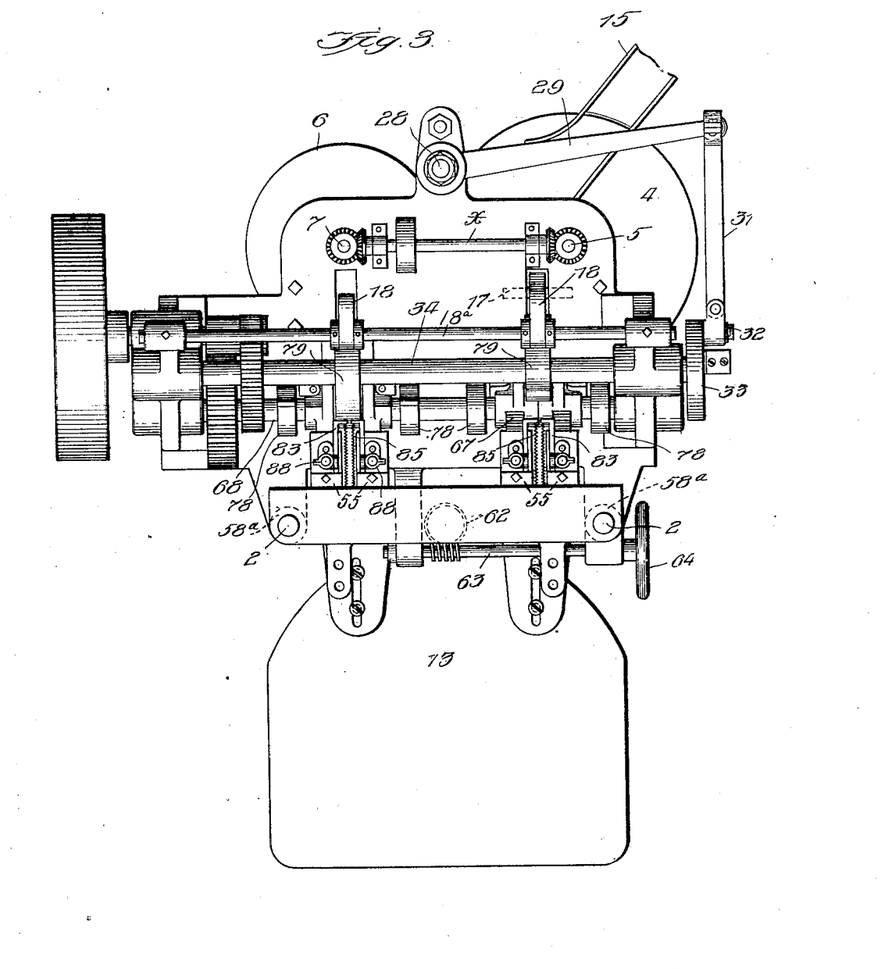
Fig. 3 is a top plan view of my machine having the magazine and hopper removed as in Fig. 1.
Figure 4:
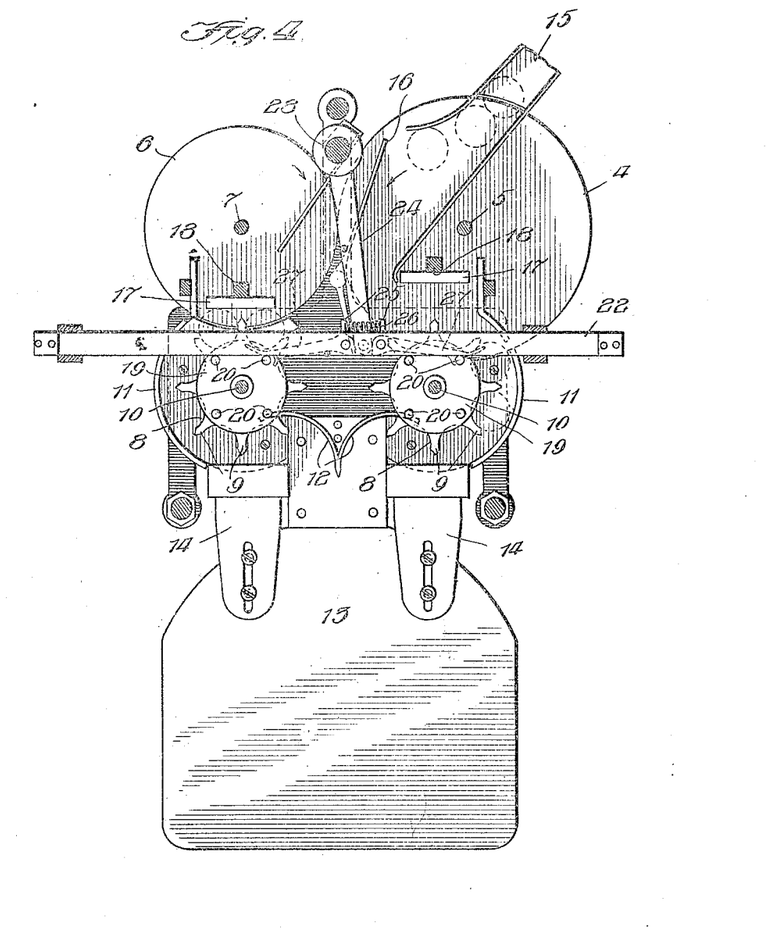
Fig. 4 is a horizontal transverse section taken on the line 4—4, Fig. 1.
Figures 5, 9, 10, 11:
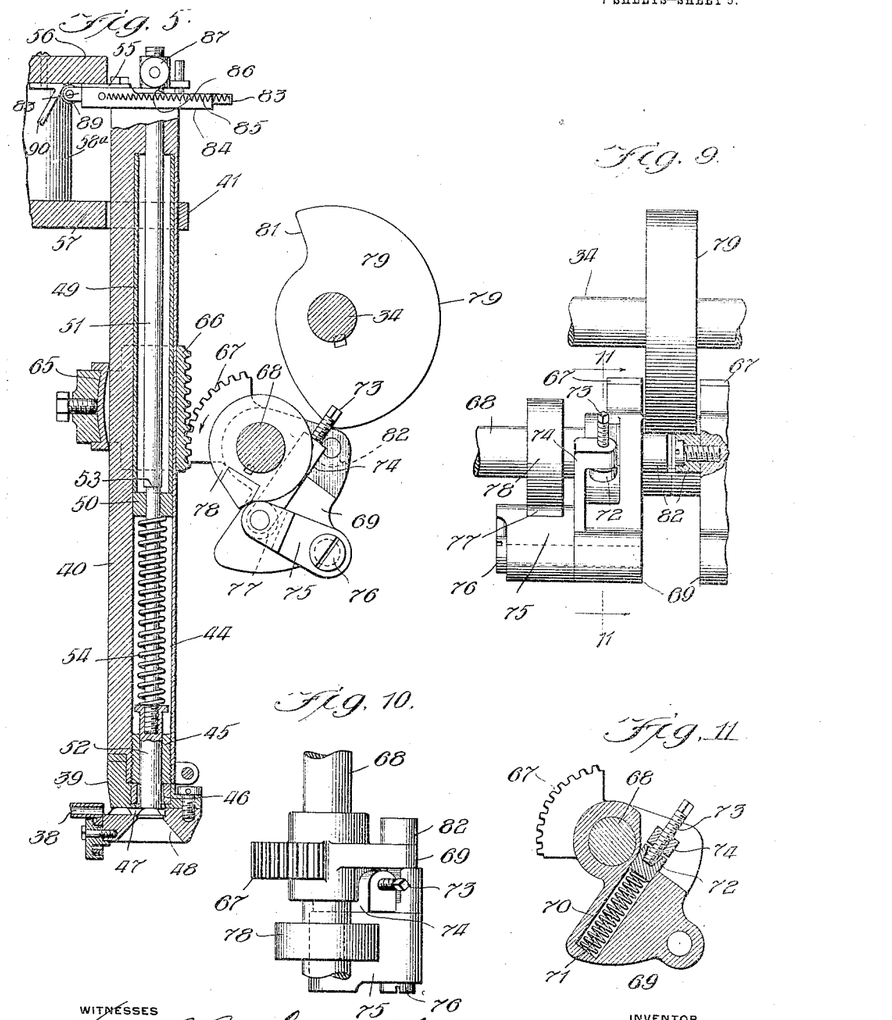
Figs. 5, 6, 7 and 8 are diagrammatical fragmentary views of the plunger and actuating devices therefor drawn to a larger scale.
Fig. 9 is a rear elevation of said actuating devices showing the arrangement of the same in pairs.
Fig. 10 is a top plan view of the same having one set of actuating devices removed.
Fig. 11 is a transverse vertical section taken on line 11—11, Fig. 9.

A hollow sleeve 49 of suitable thickness is fitted in the upper portion of the bore 44 of the plunger-bar that extends down about one-half the length of said plunger where it abuts against a bushing 50. This bushing has a restricted bore and, together with the bore of the lower bushing 45 and the reduced bore in the upper part of the plunger, acts as a guide for a suitable rod 51, which latter has its lower end screw-threaded and has a flanged head or ejector-plug 52 secured thereto. A shoulder 53, made by reducing the diameter of the lower portion of said rod, limits the downward movement thereof and a coiled expansion-spring 54 surrounding the said rod between the bushing 50 and the ejector-head 52 on its lower end keeps said rod normally in the position shown in Fig. 5.

The "throw" or vertical reciprocal movement of the plunger is limited by a forwardly projecting lug 55 that is secured to its upper end, and is adapted to engage the upper and lower parallel stop-lugs 56 and 57 projecting rearwardly from upper and lower cross-bars 58, which latter connect sleeves 58ª mounted on the upper ends of the standards 2 at the front corners of the machine. These cross-bars and sleeves constitute a frame which is vertically adjustable by means of an internally screw-threaded column 60 depending from the center of length of the lower cross-bar, and engaged by a centrally located screw-shaft 61, which latter is rotated through the medium of a worm-gear 62 mounted thereon, and a worm on a horizontal shaft 63. This horizontal shaft is arranged transversely and its opposite end is provided with a hand-wheel 64, by manipulating which the framework carrying the stop-lugs 56 and 57 and the magazine or hopper for the cap-blanks, is raised or lowered so as to adjust the bottle-capping mechanism to the different heights of bottles.

Secured to the plunger 40 in any suitable manner (preferably removably by means of a frictional clamp 65), is a longitudinally disposed rearwardly facing vertical rack 66, which is engaged and reciprocated by a suitable segmental gear 67. The boss of this gear 67 is loosely mounted on a transverse drive-shaft 68, and it forms an important part of the mechanical movement that accomplishes the sealing of the bottle by lowering the plunger 40 against the cap. The portion of the boss of the gear on the side opposite its gear-teeth is provided with a suitably shaped enlargement 69, extending, preferably, in a plane parallel to the plane of said gear, and is bored out to form a tangential pocket 70, in which a coiled expansion spring 71 of relatively high tension is seated. A shoe 72 is placed in the outer end of this pocket 70 and is pressed against the spring 71 by means of a set-screw 73 tapped through the lateral member of an inverted L-shaped arm 74 pivotally secured to the side of a suitable link 75. This link 75 is pivotally mounted on the outer extended end of a bolt 76 tapped into a lateral lug on said enlargement 69, and opposite its pivot it is, preferably, bifurcated and has a roller 77 mounted between the arms thereof. When the spring 71 has been compressed the tendency of link 75 is to rise, but this is prevented by a cam 78 rigidly mounted on and rotatable with drive-shaft 68 above mentioned.

Figures 6, 7:
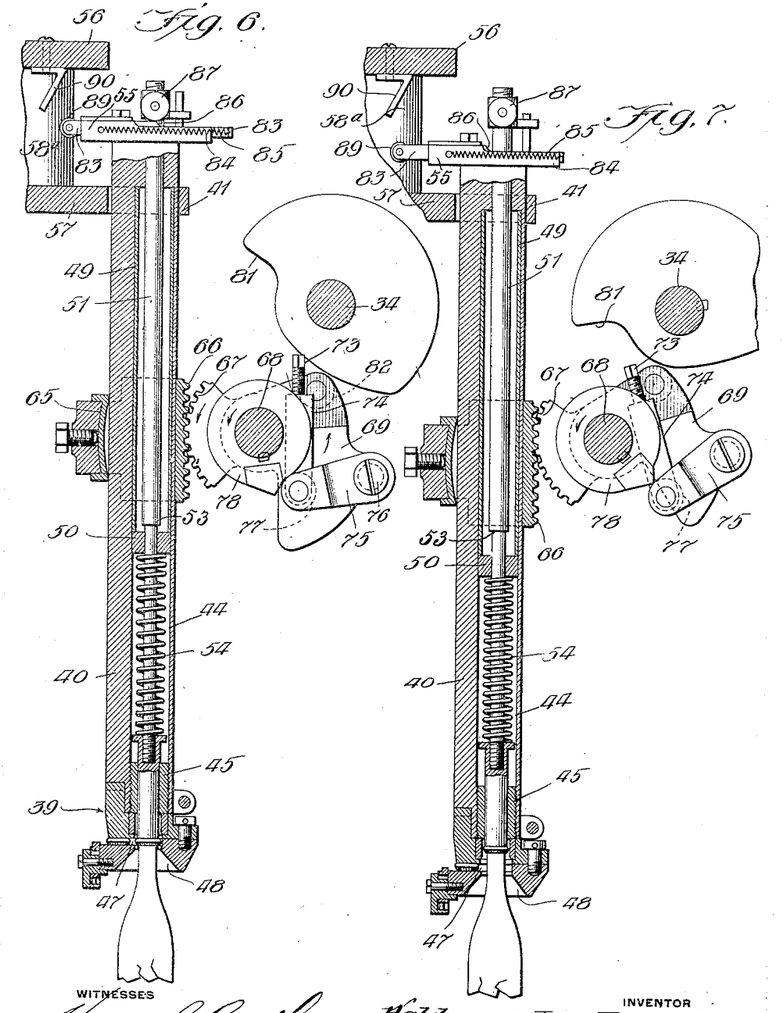

Assuming the capping plunger 40, the cam 78, and the connected elements on shaft 68, to be in normal position, (shown in Figs. 5, 9, 10 and 11), as shaft 68 rotates in the direction of the arrow the cam 78 moves therewith until the offset portion thereof comes in contact with roller 77 on the end-link 75. On account of the high tension of spring 71, the link will not now be rotated on its pivot but will move around with cam 78 carrying the segmental gear 67 and its connected parts along with it; and thus move plunger 40 downwardly until its head comes in contact with the head of the bottle to be capped. Experiment has demonstrated the fact that a pressure of approximately seven hundred pounds (700 lbs.) is the most efficient to use in capping and sealing a bottle containing liquids. For this reason the spring 71 is compressed until a similar pressure is obtained thereon. Now, during the transmission of the movement of the drive-shaft 68 to cam 78, the plunger will continue to move downward until the resistance resulting from the capping operation, overcomes the resistance of spring 54, which will be greater than seven hundred pounds (700 lbs.) whereupon cam 78 will push link 75 outward and release segmental gear 67 and its conjunctive parts and the spring 54 will be free to expand. For example: after the plunger has reached the bottle, and the cap brought into contact with the same, said plunger continues its downward movement a slight distance until sufficient pressure has been utilized to force the cap onto the bottle and any further movement of the plunger would probably break the bottle. At this moment the embossment on the periphery of cam 78 will move past the roller, as illustrated in Fig. 7, and the segmental gear 67 and its connected parts will remain stationary in the position they assumed as the cam was released.

In order to return the plunger to normal position again it is necessary to move the segmental gear in a reverse direction to the rotation of shaft 68. This is accomplished by means of a cam 79 keyed to the main shaft 34 which is parallel to and rotates at the same speed as shaft 68 but in reverse direction thereto. This cam 79 has one face 81 that is arranged substantially radial from its axis that is adapted, a moment after the release of the pressure on the bottle, to engage a roller 82 mounted on the adjacent side of the oppositely extending enlargement 69 of the segmental gear 67. As cam 79 moves forward the parts connected to the segmental gear and the enlargement, (including the link 75 and L-shaped arm 74 carried thereby) will move in a reverse direction on shaft 68 until the plunger has been raised the full limit of its upward movement or until the roller 82 has passed out of engagement with the cam 79.

Figure 8:
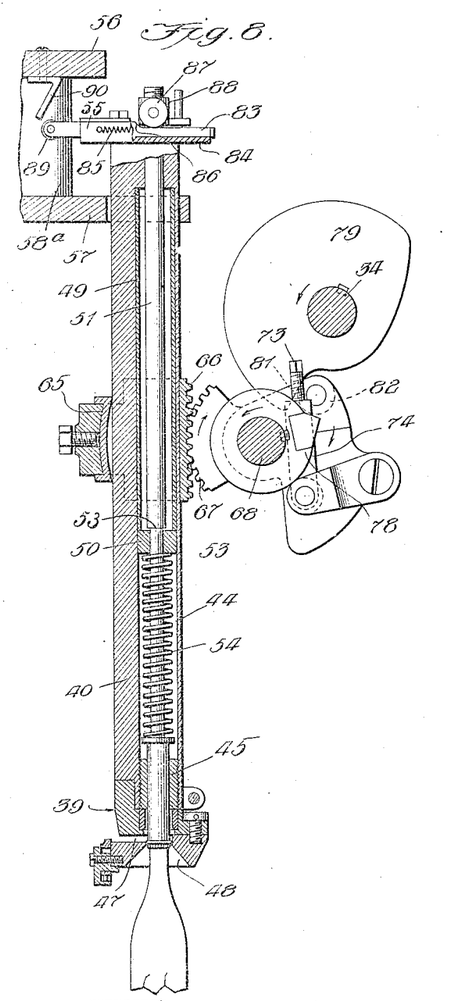

When the machine is in operation, in order to prevent a bottle becoming wedged in the throat 46 of the plunger, and be in danger of being raised by the same, I have provided a simple device for this purpose. This consists of a transversely disposed slide-plate 83 reciprocably mounted in a horizontally disposed guide-block 84 secured to the upper end of the plunger 40. This is kept normally at one end of its movement by a coil-contraction spring 85 and has a suitable shoulder 86 on its upper surface. A roller 87 is journaled on a horizontally disposed pin projecting from a sleeve 88 adjustably mounted on the upper extended end of the rod 51. The outer end of slide-bar 83 has a roller 89 journaled therein, and this roller is adapted to engage the inclined surface of an inverted acute angle L-shaped bracket 90 bolted to the under surface of the upper stop-plate 56. In normal position (Fig. 5) the rod 51 is elevated on the shoulder 86 of slide 83 by reason of the engagement of the roller 89 with the inclined face of bracket 90 which has pushed slide 83 to the right. Owing to greater tension of spring 54 on rod 51 the slide will not be drawn back by spring 85 until said rod 51 has been slightly raised by the operation of capping a bottle, and when plunger 40 is raised the rod will remain in contact with the capped bottle until the latter has been forced out of the throat of the plunger. During the return of the plunger, when the bottle is wedged, the head 52 on the rod 51 will engage and eject the bottle from the tapered throat owing to the pressure of the spring 54 surrounding the piston. The parts will then be in the position shown in Fig. 8; the roller 87 resting upon the lowest surface of the slide 83, and upon the raising of the plunger 40 the bottle will remain upon the table or bed of the machine, while the roller 89 will engage bracket 90 and force said slide-bar 83 longitudinally so that the rod 51 will be drawn upwardly in the plunger. This will elevate the rod 51 so that its lower end is high enough to permit the next cap to be fed into the lower end or head of said plunger,—this movement of the rod being caused by the shoulder 86 of the slide bar engaging and elevating the roller 87 on the upper end of the rod (see Fig. 5).

In operation, the bottles are fed from the runway 15 onto the rotatable table 4 where they are separated by switch-arm 16 so that approximately every other pair of bottles will pass to the rotatable table 6. Stops 11 halt the further movement of the bottles and the respective walking beams 18 operating in conjunction therewith will move alternately inwardly and shift each pair of bottles into two of the pockets of their respective turrets 8 wherein said bottles continue to travel intermittently in a rotary path until they arrive under the proper capping plungers. Said plungers have a reciprocatory movement in a vertical plane that is imparted to them through the medium of the segmental gear 67 and rack 66 driven by shaft 68. The plunger having received a cap-blank from feed-chute 37—38 is moved downwardly by the engagement of cam 78 with arm 75 until the compression on the spring 71 has reached a point sufficient to firmly crimp the cap on the bottle and seal the same. At this point the pressure of the spring is overcome by the cam passing the arm 75 while the cam 81 engages roller 82 on the opposite edge of segmental gear 67 and moves the latter in the opposite direction, i. e., upwardly to raise the capping plunger and restore the same to its normal position. During this capping period, the ejecting rod 51 has been moved upwardly through the plunger by the bottle so as to permit the cap and neck thereof to enter the contracted throat 46 and upon the return movement of said plunger said rod has been kept pressed out through the bottom of the plunger by the spring 54 until the bottle has been ejected from the plunger head. Before the plunger reaches the limit of its upward movement, the mechanism at the top thereof will be actuated and the rod 51 restored to its normal position and the device is then ready for the next capping operation.

What I claim as new is:—

1. A machine of the kind specified, comprising a vertically reciprocal capping plunger, a longitudinal rack secured thereto, a transverse shaft, a member fast upon said shaft, a segmental gear meshing with said rack and loosely mounted on said shaft, and adapted to be moved by said member during a portion of its revolution, and means for restoring said segmental gear to its original position.

2. A machine of the kind specified, comprising a vertically reciprocal capping plunger, a longitudinal rack secured thereto, a transverse shaft, a member fast upon said shaft, a segmental gear meshing with said rack and loosely mounted on said shaft, devices carried by said segmental gear that are engaged by said member and cause said gear to move therewith for a portion of a revolution, and means for restoring said segmental gear to its original position.

3. A machine of the kind specified, comprising a vertically reciprocal capping plunger, a longitudinal rack adjustably secured thereto, a transverse shaft, a member fast upon said shaft, a segmental gear meshing with said rack and loosely mounted on said shaft, and adapted to be moved by said member during a portion of its revolution, and means for restoring said segmental gear to its original position.

4. A machine of the kind specified, comprising a vertically reciprocal capping plunger, a longitudinal rack secured thereto, a transverse shaft, a member fast upon said shaft, a segmental gear meshing with said rack and loosely mounted on said shaft, devices including a yielding part carried by said segmental gear that are engaged by said member and cause said gear to move therewith for a portion of a revolution, and means for restoring said segmental gear to its original position.

5. A machine of the kind specified, comprising a vertically reciprocal capping plunger, a longitudinal rack secured thereto, a transverse shaft, a segmental gear meshing with said rack, a cam mounted on said shaft, devices carried by said segmental gear that are engaged by said cam and cause said gear to move therewith for a portion of a revolution, and an independently revoluble cam for restoring said segmental gear to its original position.

6. A machine of the kind specified, comprising a vertically reciprocal capping plunger, a longitudinal rack secured thereto, a transverse shaft, a member fast upon said shaft, a segmental gear meshing with said rack and loosely mounted on said shaft, devices, including an adjustable compressible resistance part, carried by said segmental gear that are engaged by said member and cause said gear to move therewith for a portion of a revolution, and means for restoring said segmental gear to its original position.

7. A machine of the kind specified, comprising a vertically reciprocal capping plunger, a longitudinal rack secured thereto, a transverse shaft, a segmental gear meshing with said rack, a cam mounted on said shaft, devices, including an adjustable compressible resistance part, carried by said segmental gear that are engaged by said cam and cause said gear to move therewith for a portion of a revolution, and an independently revoluble cam for restoring said segmental gear to its original position.

8. A machine of the kind specified, comprising a vertically reciprocal capping plunger, a longitudinal rack secured thereto, a transverse shaft, a cam fast upon said shaft, a segmental gear meshing with said rack and loosely mounted on said shaft, devices, including an adjustable compressible resistance part, carried by said segmental gear that are engaged by said cam and cause said gear to move therewith for a portion of a revolution, and means for restoring said segmental gear to its original position.

9. A machine of the kind specified, comprising a vertically reciprocal capping plunger, a longitudinal rack secured thereto, a transverse shaft, a cam fast upon said shaft, a segmental gear loose upon said shaft and actuated through the medium of said cam and having an integral portion extending on the side opposite to the teeth of said gear, a pocket therein, a spring seated within the same, an arm pivoted to said extended portion, the movable end of which is engaged by said cam, a link pivoted to said movable end, and having its end bent laterally, and a set-screw tapped through the laterally bent end of said link and engaging said spring, and means for restoring said segmental gear to its original position.

10. In a machine of the kind specified, a vertically reciprocable capping plunger, a reciprocable ejector within said plunger in alinement with the axis thereof and which remains stationary against the work during the initial portion of the upward movement of the plunger and then leaves the work, and a device carried by said plunger that temporarily retains said ejector above the plane of the caps being fed to the machine, in combination with means directly engaging said plunger that moves the same toward its work and when sufficient pressure is exerted to cap the work said means releases said pressure and returns said plunger to normal position.

11. A machine of the kind specified, comprising a vertically reciprocal capping plunger, a reciprocal ejector rod within said plunger, and a device that effects a delayed withdrawal of said rod from the work, a longitudinal rack secured to said plunger, a transverse shaft, a member fast upon said shaft, a segmental gear meshing with said rack and loosely mounted on said shaft, and adapted to be moved by said member during a portion of its revolution, and means for restoring said segmental gear to its original position.

12. A machine of the kind specified, comprising a vertically reciprocal capping plunger, a reciprocal rod ejector within said plunger, a coil spring surrounding the same that compresses when said rod engages the work, a longitudinal rack adjustably and removably secured to said plunger, a transverse shaft, a member fast upon said shaft, a segmental gear meshing with said rack and loosely mounted on said shaft, and adapted to be moved by said member during a portion of its revolution, and means for restoring said segmental gear to its original position.

13. A machine of the kind specified, comprising a vertically reciprocal capping plunger, a reciprocal ejector rod within said plunger, and a device that effects a delayed withdrawal of said rod from the work, a longitudinal rack adjustably secured to said plunger, a transverse shaft, a member fast upon said shaft, a segmental gear meshing with said rack and loosely mounted on said shaft, and adapted to be moved by said member during a portion of its revolution, and means for restoring said segmental gear to its original position.

14. A machine of the kind specified, comprising a vertically reciprocal capping plunger, a reciprocal ejector rod within said plunger, a device that effects a delayed withdrawal of said rod from the work, a longitudinal rack secured to said plunger, a transverse shaft, a segmental gear meshing with said rack, a cam mounted on said shaft, devices carried by said segmental gear that are engaged by said cam and cause said gear to move therewith for a portion of a revolution, and an independently revoluble cam for restoring said segmental gear to its original position.

15. A machine of the kind specified, comprising a vertically reciprocal capping plunger, a reciprocal ejector rod within said plunger, a device that effects a delayed withdrawal of said rod from the work, a longitudinal rack secured to said plunger, a transverse shaft, a cam fast upon said shaft, a segmental gear loose upon said shaft and actuated through the medium of said cam and having an integral portion extending on the side opposite to the teeth of said gear, a pocket therein, a spring seated within the same, an arm pivoted to said extended portion, the movable end of which is engaged by said cam, a link pivoted to said movable end and having its end bent laterally, a set-screw tapped through the laterally bent end of said link and engaging said spring, and means for restoring said segmental gear to its original position.

In witness whereof I have hereunto set my hand this 27th day of May, 1911.

WALDEMAR JENS PETER OLSEN.

Witnesses:
FRANK D. THOMASON.
E. K. LUNDY.